March 17, 1970 — W. F. FISHER — 3,501,231
SLIDE PROJECTOR INCLUDING TWO LIGHT PATHS AND ONE SLIDE MAGAZINE
Filed Aug. 25, 1967 — 2 Sheets-Sheet 1
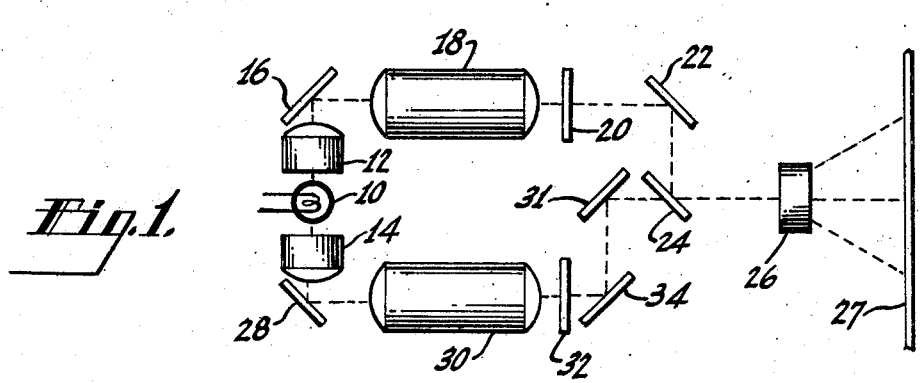
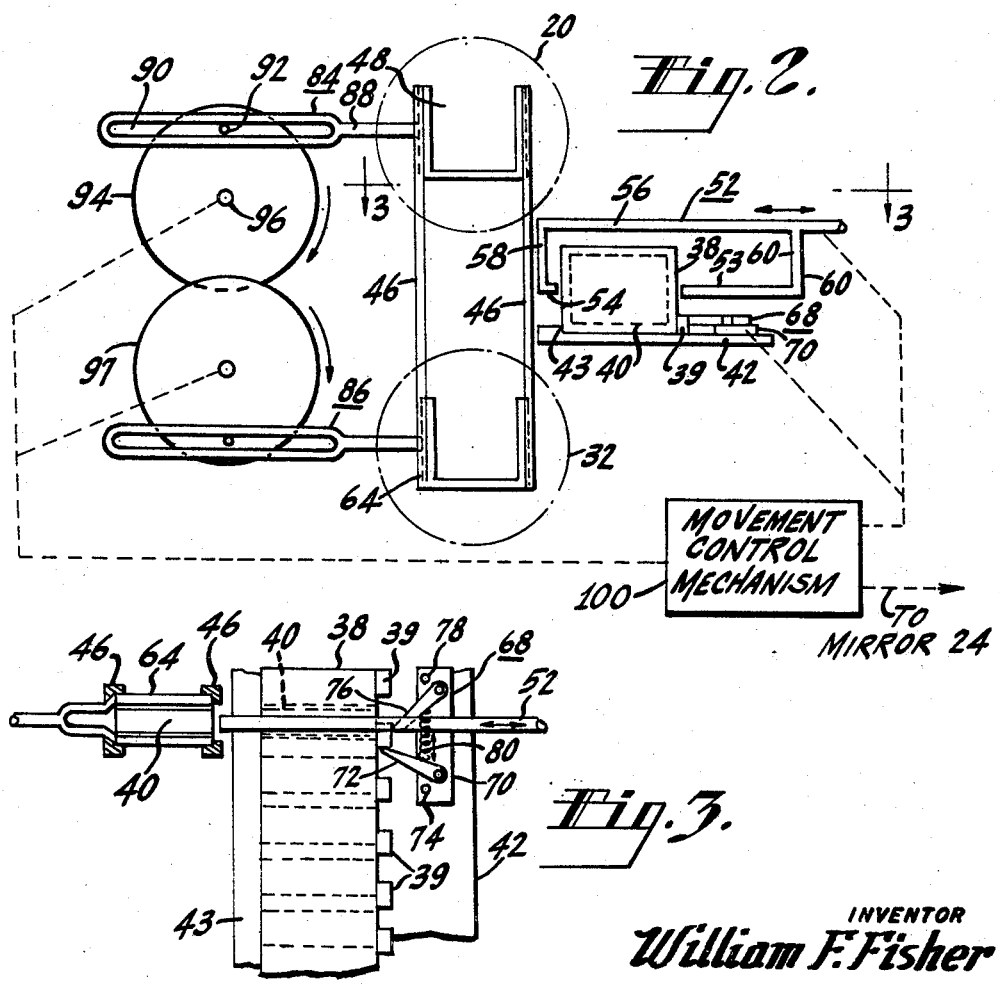
INVENTOR
William F. Fisher
BY Simon Yaffee
ATTORNEY

United States Patent Office 3,501,231
Patented Mar. 17, 1970

3,501,231
SLIDE PROJECTOR INCLUDING TWO LIGHT PATHS AND ONE SLIDE MAGAZINE
William F. Fisher, Philadelphia, Pa., assignor to RCA Corporation, a corporation of Delaware
Filed Aug. 25, 1967, Ser. No. 663,366
Int. Cl. G03b 21/14
U.S. Cl. 353—82        4 Claims

ABSTRACT OF THE DISCLOSURE

A slide projector is disclosed having two light paths each including a slide gate and extending from a light source to a screen, the light paths being so arranged that one light path is above the other. Slides, which are taken out of a single magazine are positioned in the two slide gates and are projected alternately and are put back into the magazine in the same order that they were originally placed in the magazine.

Background of the invention

For speeding up the projection of slides, it has been suggested that successive slides be projected on the same screen either by the use of two projectors alternately or by the use of one projector having a plurality of light paths and a slide gate at each light path. However, when independent slide magazines are used to supply the slides for the two projectors or for the two light paths, adjacent compartments of each of the two magazines contain slides that are shown alternately. Difficulty is experienced in loading the slides into the magazines in the correct order. When one magazine is used to supply slides for both projectors or for both light paths, the projected slides are returned to the first magazine in their original order manually after all the slides have been projected, resulting in extra effort and in delay and also in possible error in properly returning the slides to the magazine.

The sides of slide magazines that are to be used with mechanical slide projectors must be open to permit access of the slide pusher into both sides of the slide compartments and also to permit a slide to be pushed into or out of a compartment. Therefore, the slide magazine should be oriented so that the slides will not fall out of their compartments, that is, it should be oriented so that the top of the magazine is up. In known systems comprising two projectors aimed at one screen or one projector having two light paths, the light paths are positioned side by side. Since a slide magazine should not be turned on its side, use of such known projector systems with the slide magazines involves a complicated motion for the means that moves the slide from the magazine to a slide projecting position.

It is an object of this invention to provide improved means for taking slides out of one magazine and projecting them alternately on the same screen and putting the slides back into the same magazine and in the same relative order in which they were originally taken out of the magazine.

Summary of the invention

In accordance with the invention a slide projector having two light paths, or two slide projectors, are provided in which one of the light paths is above the other. A slide magazine is positioned in an upright manner to one side of both light paths and at an elevation which is between the elevations of the two light paths. Slide pusher means are provided to move slides out of the magazine and to move them to an intermediate position between said light paths and more nearly in line with said light paths than the position of the magazine. Means are also provided for moving the slides alternately from the intermediate position into the two light paths and back to the intermediate position, from where they are moved back into the magazine. The slide magazine is moved two steps forward and one step back to present a full compartment to the slide pusher when it is moving a slide to the intermediate position and to present an empty compartment to the slide pusher when the pusher is moving a slide back into a compartment, whereby the slides are returned to the magazine in the same order or relative position as they were originally placed therein.

Brief description of the drawings

The invention will be better understood upon reading the following description when read in connection with the following drawing in which:

FIGURE 1 is a schematic side elevational view of a projector with which the slide changing mechanism of the invention may be used, FIGURE 2 is a schematic elevational view of a slide changing mechanism of this invention and showing the relationship of the slide changing mechanism and of the slide gates shown in FIGURE 1.

FIGURE 3 is a schematic sectional view of the slide changing mechanism of FIGURE 2, on the line 3—3.

Description

Figure 4:
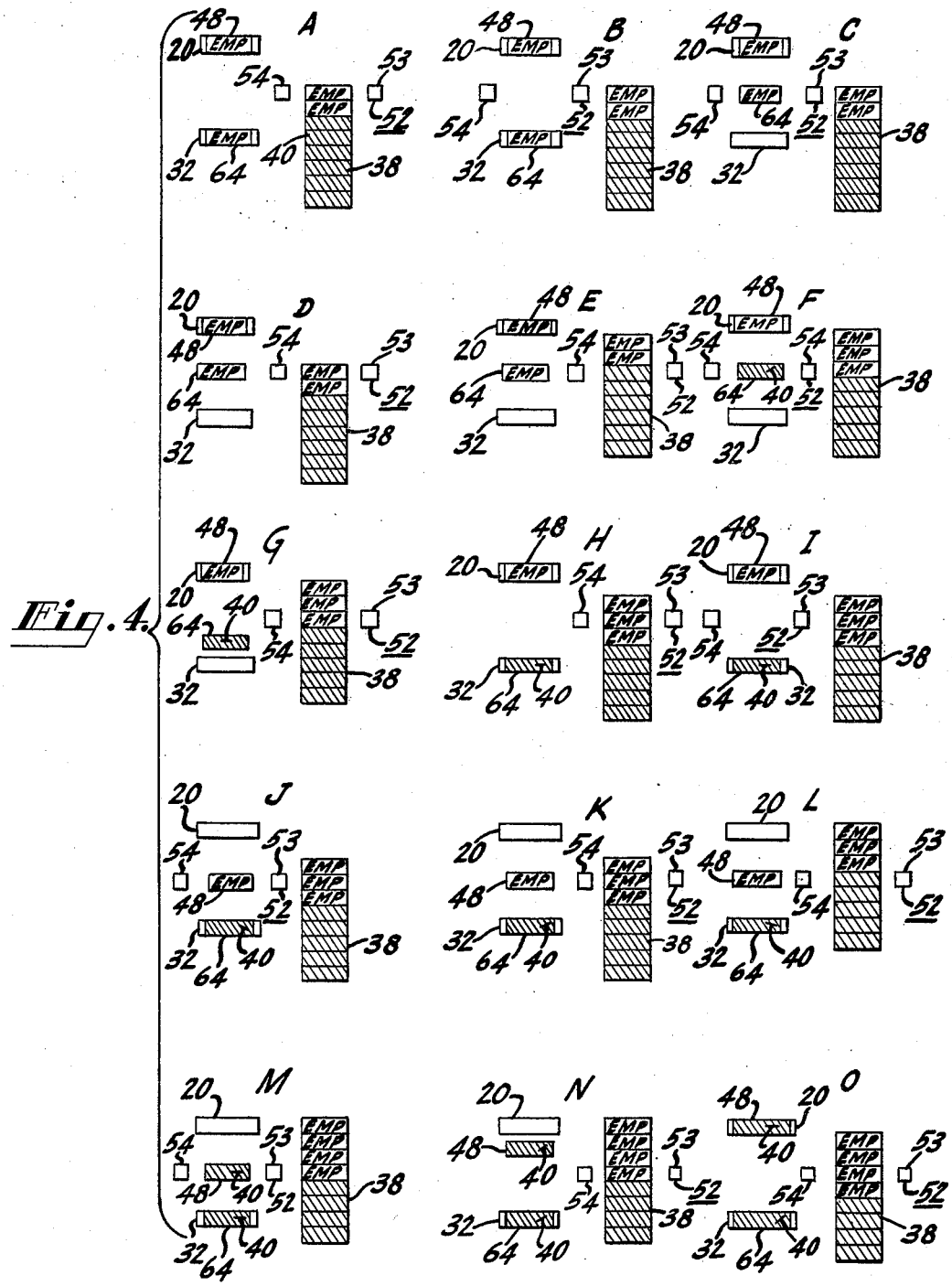
FIGURES 4A to 4O are diagrams useful in explaining the operation of the described slide changer.

As shown in FIGURE 1, a projector lamp 10 throws light into an upper condenser lens system 12 and a lower condenser lens system 14. The light from the lens system 12 strikes the mirror 16 which is positioned at a 45° angle with respect to the axis of the lens system 12. The light striking the mirror 16 is deflected 90° and goes through a focusing lens system 18. The light from the focusing lens system 18 goes through an upper film gate 20 and then is deflected down in a direction parallel to the axis of the lens system 12 by another mirror 22. The light hits another mirror 24 and enters a projection lens 26 and is projected on a screen 27 in a known manner. The mirror 24 is moveable in its own plane and also in a direction perpendicular to the axis of the projection lens 26, that is perpendicular to the plane of the paper in FIGURE 1 between a position where the light from the mirror 22 hits the mirror 24 and a second position where the light from the mirror 22 does not hit the mirror 24, for a purpose to be explained.

The light from the condenser lens 14 hits the mirror 28 and is reflected into a path parallel to the axis of the lens system 18 and also in a direction towards the screen 27. The light reflected from the mirror 28 passes through a lens system 30 and through a second or lower film gate 32. After the light has passed through the slide gate 32, the light is reflected upwards by a mirror 34 into a path parallel to the axis of the lens system 14. However, the mirror 34 is so positioned that the path of the light reflected therefrom is closer to the light source 10 than the path of the light reflected from the mirror 22. A mirror 36 is positioned and arranged to reflect the light from the mirror 34 into line with the light from the mirror 24 and traveling in the same direction. Therefore, when the mirror 24 is in its position to reflect the light from the mirror 22 into the projecting lens 26, the mirror 24 blocks the light from the mirror 36, and when the mirror 24 is in its alternate position where it is not in position to reflect the light from the mirror 22, the light from the mirror 36 shines into the projection lens 26. Therefore, the slide in the upper gate 20 or the slide in the lower gate 32 is projected on the screen 27, when the mirror 24 is in its light reflecting position and when it is in its non-reflecting position respectively.

The film gates 20 and 32 of FIGURE 2 correspond to the film gates 20 and 32 respectively of FIGURE 1.

A magazine 38 having slides 40 therein is positioned on a supporting table 42, which may be to the right of and substantially half way between the film gates 20 and 32. This magazine 38 is of the type having parallelly arranged compartments each having open sides and a closed top and bottom, so built that a slide 40 can be slipped into and out of the compartments of the magazine 38 from the left as viewed in FIGURE 2. Furthermore, a slide pusher 52 to be described can be moved into a compartment of the magazine 38 from the right as viewed in FIGURE 2. The magazine 38 also has teeth 39 along the lower right hand side thereof for moving the magazine 38 in a direction parallel to the length thereof. The table 42 has a shoulder 43 which acts as a guide for the lower left hand edge of the magazine 38. Guides 46 extend between the gates 20 and 32. Slide holders 48 and 64 which have open sides and an open top are located for motion up and down along the guides 46. The slide holder 48 moves between extreme positions, the upper one of which is in the film gate 20 and the lower one of which is in line with the table 42 and in position to receive a slide 40 from the magazine 38, or conversely, to deliver a slide 40 that may be in the holder 48 into the magazine 38. The slide holder 64 moves between an upper slide exchange position with respect to the table 42 and a lower position in the film gate 32.

A slide pusher 52 is provided to push the slides 40 back and forth between two positions. The slide pusher comprises an upper bar 56, two spaced dependent parallel legs 58 and 60 and lower aligned opposed pusher bars 53 and 54. The opposed ends of the pusher bars 53 and 54 are spaced sufficiently to clear the magazine 38, the spacing of the pusher bars 53 and 54 also being sufficient to clear the holders 48 and 64. The slide pusher 52 is moved between two extreme positions in one of which the bars 53 and 54 clear the magazine 38 and in the other of which they clear the holder 48 or 64. The guides 46, as shown in FIGURE 3, are spaced and shaped so as to guide the holders 48 and 64 and also so as to permit motion of the pusher 52 thru the guides 46. In its motion between its extreme positions, the pusher 52 pushes a slide 40 from a compartment of the magazine 38 into a holder 48 or 64, or conversely the pusher 52 pushes a slide 40 from a holder 48 or 64 into the magazine 38.

The holders 64 and 48 are moved between the extreme positions by any suitable means. One such means may be the Scotch yokes 84 and 86. The Scotch yoke 84 may comprise a bar 88 having a slot 90 therealong for receiving a pin 92. An unslotted reduced portion of the bar 88 is attached to the holder 48. The pin 92 extends laterally from a wheel 94 which rotates about an axle 96. In so rotating, the wheel 94 causes the bar 88 and therefore the holder 48 to move between its extreme positions. The Scotch yoke 86 is similar in construction and in operation to the Scotch yoke 84, whereby upon rotation of the wheel 97, the holder 64 is moved between its extreme positions.

As will be further explained, the magazine 38 is moved forward the distance between three slide holding compartments and is moved backward the distance between two slide holding compartments, that is, the magazine is moved forward two steps and backward one step alternately. This is accomplished by a ratchet mechanism 68, shown in FIG. 3. The ratchet mechanism comprises a sliding plate 70 which is moved, by a mechanism such as a solenoid (not shown), back and forth the distance between three teeth 39. A first pawl 72 is pivoted on the plate 70 and extends slantingly towards the magazine 38, the end of the pawl 72 touching a side edge of a tooth 39. A stop 74 is positioned on the plate 70 to limit the rotation of the pawl 72 in a counterclockwise direction as viewed in FIGURE 3. A second pawl 76 is pivoted on the plate 70 with its tip riding on an outer edge of a tooth 39. A stop 78 is positioned on the plate 70 in a position to limit the rotation in a clockwise direction of the pawl 76. A compression spring means 80 is provided to urge rotation of the two pawls 72 and 76 against their respective stops 74 and 78. When the ratchet mechanism 68 is moved forward (up in FIGURE 3) the distance between three teeth 39, the magazine 38 will be advanced two steps. However when the ratchet mechanism 68 is moved back the same distance, the tip of the pawl 76 will ride on the top of a tooth 39 and will not start pushing the magazine back until the tip of the pawl 76 strikes the side of the next tooth 39. Therefore, when the ratchet mechanism 68 is moved back, it pushes the magazine back only one step. The stop 78 for the pawl 76 may be positioned for accurately controlling the final position of the rack at the end of each back motion thereof.

The operation of the described slide projector is described in connection with FIG. 4 and is as follows:

See FIG. 4A.—There is no slide in either holder 48 or 64. The holder 48 is at the top of guides 46 (not shown in FIGURE 4) and in the upper gate 20. The holder 64 is at the bottom of the guides 46 and in the lower gate 32. The magazine 38 is placed so that its first compartment is in line with the pusher 52. The first and second compartments of the magazine 38 are empty. The slides 40 are in the third, fourth, fifth, etc., compartments of the magazine 38 in the order in which they are to be shown. The pusher bars 53 and 54 which comprise the pusher 52 straddle the magazine 38. The moving mirror 24 in its retracted position; if the lamp 10 (FIGURE 1) is on, the screen 27 will be illuminated but blank since there is no slide in gate 32.

See FIGURE 4B.—The mirror 24 is moved to blank the light from gate 32 and to project the light from gate 20.

The pusher 52 goes through the first empty compartment in the magazine 38 and moves to where it will straddle the holder 64 when the holder 64 reaches its uppermost position.

See FIGURE 4C.—Holder 64 moves up the guides 46 to its intermediate position.

See FIGURE 4D.—The pusher 52 moves to where it will straddle the magazine 38.

See FIGURE 4E.—The magazine 38 is moved two steps forward (up as viewed in FIGURES 3 and 4D) by operation of the ratchet 68 to present a full compartment to the pusher 52.

See FIGURE 4F.—The pusher 52 pushes a slide into the slide holder 64.

See FIGURE 4G.—The holder 64 moves down to gate 32. However, as soon as the holder 64 has moved far enough to clear the pusher 52, the pusher goes to where it straddles the magazine 38.

See FIGURE 4H.—The magazine 38 is moved back one step so that second compartment which was empty at the outset and is still empty is in line with the pusher 52.

See FIGURE 4I.—The mirror 24 is retracted to permit projection of the slide in the gate 32. The pusher 52 goes through the second empty compartment in the magazine 38 and moves to where it will straddle the holder 48 when the holder 48 reaches its lowermost position.

See FIGURE 4J.—Holder 48 moves down the guides 46 to its intermediate position.

See FIGURE 4K.—The pusher 52 moves to where it will straddle the magazine 38.

See FIGURE 4L.—The magazine 38 is moved two steps forward (up as viewed in FIGURES 3 and 4) by operation of the ratchet 68 to present a full compartment to the pusher 52.

See FIGURE 4M.—The pusher 52 pushes a slide into the slide holder 48.

See FIGURES 4N and 4O.—The holder 48 moves up to gate 20. However, as soon as the holder 48 has moved far enough to clear the pusher 52, the pusher goes to where it straddles the magazine 38. The magazine 38 is moved back one step so that the empty compartment from which the slide, now in gate 32, was extracted is in alignment with the pusher 52.

What has been described to this point is the initial loading of a slide in each of the two projection gates 20 and 32. From this point on, each operation of the slide change sequence will return a slide to its original compartment (FIGS. 4D and 4K) in the magazine 38 and move a new slide in sequence into one of gates 20 and 32.

While the magazine described can be set up to continuously change slides at a rate determined by the drive mechanism, it may be convenient to cause one cycle of operation, that is one change of a slide, either into the upper or the lower gate 20 or 32, upon pressing an actuating button (not shown).

While in order to avoid unnecessary confusion in the drawing, no means have been shown for moving the pusher 52, the ratchet mechanism 68, the wheels 94 and 97, nor the mirror 24, they can be moved by any known mechanism such as a solenoid or a cam mechanism, or a Scotch yoke (not shown). Conventional mechanical and other interconnections represented in FIG. 3 as block 100 can be provided to operate the respective moving elements in the time sequence and manner outlined above.

Modifications of the above-described apparatus may occur to a person skilled in the art. For example, the guides 46 for the slide holders 48 and 64 may be omitted. The table 42 and the magazine 38 may be positioned either to the right or to the left of the two light paths. The ratchet means 68 for moving the magazine 38 merely is illustrative of one type of magazine moving means. Therefore, the above description is to be considered as illustrative and not in a limiting sense.

What is claimed is:

1. A projecting means having two light paths, one above the other,
   means for supporting a slide magazine having slides in compartments thereof at one side of the line joining the two light paths and at a level between said light paths,
   means to take slides out of adjacent compartments of a magazine positioned on said supporting means and to return said slides into said magazine in the relative order in which they were before they were taken from the magazine, and means cooperating with said second mentioned means to position said slides alternately in said light paths.

2. The invention as expressed in claim 1 in which said means to take said slides out of adjacent compartments comprises a slide pusher which includes opposed spaced pusher rods, the ends of said pusher rods being separated at least the width of said magazine.

3. The invention as expressed in claim 1 in which said means to take said slides out of adjacent compartments comprises a slide pusher which includes opposed spaced pusher rods, the ends of said pusher rods being separated at least the width of said magazine and said invention further including means to move said magazine the distance between three compartments in a forward direction to present a full compartment to said slide pusher.

4. The invention as expressed in claim 1 in which said means to take said slides out of adjacent compartments comprises a slide pusher which includes opposed spaced pusher rods, the ends of said pusher rods being separated at least the width of said magazine, said invention further including means to move said magazine the distance between three compartments in a forward direction to present a full compartment to said slide pusher and to move said magazine the distance between two compartments in a backward direction to present an empty compartment to said slide pusher.

References Cited

UNITED STATES PATENTS

| 2,967,457 | 1/1961 | Jackson | 353—49 |
| 2,990,750 | 7/1961 | Zillmer | 353—114 |
| 3,194,115 | 7/1965 | Giwosky | 353—83 |
| 3,216,138 | 11/1965 | Walter | 353—116 |

HARRY N. HAROIAN, Primary Examiner

U.S. Cl. X.R.

353—49, 116